United States Patent [19]

Kamatani et al.

[11] Patent Number: 4,595,741

[45] Date of Patent: Jun. 17, 1986

[54] METHOD FOR PRODUCING POLYURETHANE RESINS

[75] Inventors: Yoshio Kamatani, Osaka; Takurou Sakamoto, Kawanishi, both of Japan

[73] Assignee: Takeda Chemical Industries, Ltd., Osaka, Japan

[21] Appl. No.: 672,191

[22] Filed: Nov. 16, 1984

[30] Foreign Application Priority Data

Nov. 18, 1983 [JP] Japan .................... 58-217989

[51] Int. Cl.$^4$ ................ C08G 18/18; C08G 18/77
[52] U.S. Cl. ............................ 528/53; 528/73; 528/74.5; 528/75; 427/340
[58] Field of Search ................ 528/73, 74.5, 53

[56] References Cited

U.S. PATENT DOCUMENTS 3,874,898  4/1975  McInnes et al. .................. 117/62
4,408,034  10/1983  Kazama et al. .................. 528/54
4,443,590  4/1984  Kamatani et al. .................. 528/51
4,443,597  4/1984  Kamatani et al. .................. 544/67
4,456,744  6/1984  Kamatani et al. .................. 528/71

Primary Examiner—Herbert S. Cockeram
Attorney, Agent, or Firm—Antonelli, Terry & Wands

[57] ABSTRACT

Polyurethane resin curable at low temperature and in a short time is prepared by contacting a compound having 1-oxa-3,5-diazine-2,4,6-trione ring as well as isocyanate groups, e.g. a reaction product of an aliphatic, alicyclic or aralkyl polyisocyanate, e.g. hexamethylene diisocyanate and carbon dioxide and a compound having active hydrogen, e.g. polyester polyol, with tert-amine, e.g. trimethylamine present in gaseous phase, at a temperature of 0°–100° C. The ratio of the sum of the numbers of the trione ring and the isocyanate group to the number of the active hydrogen in the compound having the same is 0.1 to 10.

27 Claims, No Drawings

METHOD FOR PRODUCING POLYURETHANE RESINS

This invention relates to a process for producing a polyurethane resin which comprises reacting a compound having both the 1-oxa-3,5-diazine-2,4,6-trione ring and a isocyanate group with a compound having active hydrogen under specific conditions.

In general, urethane resins are widely used as coating materials, printing inks, adhesives, etc. because of their excellent toughness, chemical resistance, adhesion, and gloss. Also urethane resin components employed for such uses may ordinarily be classified into one-package type and two-package type. The former comprises a compound having at least two isocyanate groups in one molecule and having a molecular weight of 500 to 10,000. When this compound is applied to a substrate, the isocyanate group reacts with water, for example, in the air to cause curing with polymerization and crosslinking. In the latter case, a main component comprising a polyol having at least two hydroxyl groups in one molecule and a curing agent comprising a polyisocyanate having at least two isocyanate groups in one molecule which are mixed at a specific ratio are applied to a substrate and curing with polymerization and crosslinking occurs due to the reaction of the isocyanate group and the hydroxyl group.

The reaction of an isocyanate with water or with a hydroxyl group is considered to proceed relatively rapidly. However, when the urethane resin is to be continuously applied and cured and dried in a short period of time as in line coating process, printing process, bonding process and the like, the curing speed of urethane resin components utilizing said reactions is practically not sufficient and actually catalysts are added. Also the coated resin is baked at 100° C. or higher and 200° C. or higher in some case to attain rapid curing. However, addition of catalysts to resin compositions results in reduction of storage stability and, in case of the two-package type resin compositions, causes shortening of pot life of the mixture of the two components and also reduction of workability. Baking and drying at high temperatures require a large energy and bring about heat deterioration of substrates and thus cannot be used especially for plastics substrates. An aliphatic isocyanate is used for forming non-yellowing urethane resins which are recently often used in the field of coating materials. The aliphatic isocyanate is inferior in reactivity to an aromatic isocyanate and hence it is more difficult to perform rapid curing with an aliphatic isocyanate.

For rapid curing at normal temperatures, it has been proposed to make a treatment with an amine in the vapor phase (U.S. Pat. No. 3,874,898). According to this method, there is used amine having active hydrogen such as ammonia, monoethylamine, ethylenediamine, etc. These amines react with isocyanate group and act as a chain extender or crosslinking agent.

The amino group has a markedly higher rate of reaction with isocyanate group as compared with water and hydroxyl group and so according to the above method rapid curing can be attained even in case of aliphatic isocyanate type urethane resins. However, the amine is captured by isocyanate groups in the surface layer of a coating film and causes a crosslinking reaction to form a hardened film whereby diffusion of amine vapor into the coating film is prevented. Therefore, the above mentioned method can be applied only to coating or printing of thin films. Furthermore, it is also difficult to allow a stoichiometric amount of the amine to act on the isocyanate group.

U.S. Pat. No. 4,408,034 proposes a method which comprises reacting a compound having a specific isocyanate group, namely, an isocyanate group which links to an aromatic ring through a methylene group with a compound having active hydrogen under treatment with a tertiary amine in the gaseous phase. However, the specification of said patent discloses that in case of compounds having aliphatic isocyanate groups other than said specific isocyanate group, the tertiary amine in gaseous phase does not exhibit sufficient catalytic effect.

Aliphatic isocyanate is widely used in the field of urethane resins because of its excellent weather resistance and yellowing resistance, but it has the defect of inferior reactivity. For this reason, resin compositions prepared using aliphatic isocyanate and having rapid curability have not yet been put to practical use.

The inventors have made intensive researches on a method for producing polyurethane resins which require extremely short curing time at the vicinity of room temperature even with using an aliphatic isocyanate as a starting material. As a result, it has been found that curing reaction is completed at a low temperature and in a short period of time by contacting with a tertiary amine present in gaseous phase a compound having 1-oxa-3,5-diazine-2,4,6-trione ring in addition to isocyanate group in one molecule together with a compound having active hydrogen.

That is, this invention relates to a method for producing a polyurethane resin which comprises contacting a compound having 1-oxa-3,5-diazine-2,4,6-trione ring, which is occasionally abbreviated to "trione ring" hereinafter, and, isocyanate group and a compound having active hydrogen with a tertiary amine present in gaseous phase.

The compound having 1-oxa-3,5-diazine-2,4,6-trione ring and isocyanate group used in this invention may be produced, for example, by reacting aliphatic, alicyclic or aralkyl polyisocyanate with carbon dioxide.

As examples of the aliphatic, alicyclic or aralkyl polyisocyanate, mention may be made of di- or triisocyanate, such as tetramethylene diisocyanate, hexamethylene diisocyanate, $\omega,\omega'$-diisocyanatodipropyl ether, 2,6-diisocyanatocaproate, 1,6,11-triisocyanatoundecane, bis(isocyanatomethyl)cyclohexane, bis(isocyanatoethyl)cyclohexane, 1-isocyanato-3-isocyanatomethyl-3,5,5-trimethylcyclohexane, bis(4-isocyanatocyclohexyl)methane, xylylene diisocyanate, bis(2-isocyanatoethyl)benzene, etc. and dimer or trimer thereof. The polyisocyanate may be used alone or as mixtures thereof and furthermore may be used in admixture with monoisocyanate, such as methyl isocyanate, ethyl isocyanate, n-butyl isocyanate, $\omega$-chlorohexyl isocyanate, cyclohexyl isocyanate, cyclohexylmethyl isocyanate, benzyl isocyanate, phenylethyl isocyanate, etc. Besides the polyisocyanate, there may also be used adduct having terminal NCO group which are obtained by reacting polyisocyanate with polyol, e.g., ethylene glycol, propylene glycol, 1,4-butanediol, neopentyl glycol, hexylene glycol, diethylene glycol, dipropylene glycol, triethylene glycol, glycerin, trimethylolpropane, polyether polyol, polyester polyol, acrylic polyol, epoxy polyol, etc., or polyamine compound, e.g., ethylenediamine, hexamethylenediamine, phenylenediamine, polyether polyamine, polyamide polyamine, etc., in an excess of NCO group. The reaction of isocyanate with a carbon dioxide can be carried out, for example, by blowing carbon dioxide into the isocyanate in the presence of a catalyst. As the catalyst, tertiary phosphine, arsenic compound and hydroquinone may be used and the tertiary phosphine is especially effective. Ordinarily, reaction temperature is about $-10°$ C. to about $100°$ C. and reaction time is about 1 to about 20 hours. Various compounds are generally added to terminate the reaction and to stably preserve the products. Such reaction terminator and stabilizer include alkylating agent, acylating agent, acid, ester derivative, phenol, peroxide, sulfur, polysulfide, metal sulfide, halogen, etc. Especially, additives selected from peroxide sulfur, polysulfide, metal sulfide and halogen are preferred because the reaction of trione ring and isocyanate group with active hydrogen smoothly proceeds.

The product obtained by such reaction contains unreacted isocyanate monomer, low functional substance, etc. in addition to the compound having trione ring and isocyanate group. Therefore, the compound having trione ring and isocyanate group can be obtained by removing them by distillation, extraction, crystallization, etc.

In this invention, the reaction product from which unreacted isocyanate is not removed or a part of the unreacted isocyanate is removed may also be used without any harm. Furthermore, a separately produced adduct of an isocyanate and a compound having active hydrogen or a polymerized isocyanate may be added to the product. Moreover, adduct or polymerized product from the isocyanate having such trione ring may be used.

Of the compound having the trione ring and isocyanate group used in this invention that which is derived from aliphatic diisocyanate, e.g., hexamethylene diisocyanate or alicyclic diisocyanate, e.g., bis(isocyanatomethyl)cyclohexane with carbon dioxide is especially excellent in curability and properties of resin made therefrom.

The compound having trione ring and isocyanate group used in this invention has an average functionality (sum of the numbers of trione ring and isocyanate group in one molecule) of 2 to 10, preferably 2 to 5. The average functionality of the compound to be used should be properly determined depending on the number of functional group. OH value and molecular weight of the compound having active hydrogen, properties of desired resin and molecular structure of the curing agent. The compound having trione ring and isocyanate group used in this invention may, if necessary, be diluted with organic solvents, thinners, etc.

The compounds having active hydrogen used in this invention include those which have at least two active hydrogens and have a molecular weight of 62 to 100,000, preferably 200 to 50,000. More preferred compounds are polyol having 2 to 50 hydroxyl groups in one molecule and a molecular weight of 200 to 50,000. The polyol includes polyester polyol, polyether polyol, polyether-ester polyol, polyester-amide polyol, acrylic polyol, polyurethane polyol, epoxy polyol, epoxy-modified polyol, polyhydroxyalkane, oil-modified polyol, castor oil or mixtures thereof.

Examples of said polyester polyol are reaction product of polyhydric alcohol and polybasic acid. As the polyhydric alcohol, mention may be made of ethylene glycol, propylene glycol, butylene glycol, hexylene glycol, neopentyl glycol, cyclohexanedimethanol, diethylene glycol, triethylene glycol, polyethylene glycol, dipropylene glycol, polyoxypropylene glycol, polyoxybutylene glycol, glycerol, trimethylolpropane, pentaerythritol, sorbitol, etc. As the polybasic acid, mention may be made of succinic acid, adipic acid, azelaic acid, sebacic acid, phthalic acid, isophthalic acid, terephthalic acid, tetrahydrophthalic acid, hexahydrophthalic acid, maleic acid, fumaric acid and anhydrides thereof, etc. Further suitable examples are polyester polyol obtained by ring opening polymerization of lactone, such as caprolactone, methylcaprolactone, etc. with glycol, etc.

Examples of the polyether polyol are those which are obtained by polymerization of epoxide compounds such as ethylene oxide, propylene oxide, butylene oxide, tetrahydrofuran, styrene oxide, epichlorohydrin, phenylglycidyl ether, allylglycidyl ether, etc. in the presence of a catalyst such as boron trifluoride or by addition of these epoxide compounds alone or as a mixture of alternately to reactive hydrogen atom-containing initiators. As the reactive hydrogen atom-containing initiators, mention may be made of water, polyol, such as ethylene glycol, propylene glycol, glycerol, trimethylolpropane, pentaerythritol, sorbitol, etc., amino alcohol, such as ethanol amine, polyamine, such as ethylenediamine, etc.

As examples of the polyether-ester polyol, mention may be made of those which are obtained by subjecting said polyether polyol and polybasic acid to polyesterification reaction and besides those which have both the segments of polyether and polyester in one molecule and which are obtained by ring-opening copolymerization of epoxide compound and acid anhydride.

Examples of the polyester-amide polyol are those which are obtained by said polyesterification reaction where amino group-containing starting material, such as ethylenediamine, propylenediamine, hexamethylenediamine, xylylenediamine, hydrogenated xylylenediamine, ethanolamine, propanolamine, etc. are additionally used.

The acrylic polyol can be prepared by copolymerizing polymerizable monomer containing at least one hydroxyl group in one molecule with other monomers copolymerizable with said monomer. As the hydroxyl group-containing monomer, mention may be made of hydroxyethyl acrylate, hydroxypropyl acrylate, hydroxybutyl acrylate, trimethylolpropane monoacrylate, their corresponding methacrylic acid derivative, polyhydroxyalkyl maleate and fumarate, etc. As examples of the copolymerizable monomer, mention may be made of, for example, acrylic acid, its methyl, ethyl, propyl, butyl, 2-ethylhexyl ester, methacrylic acid, maleic acid, fumaric acid, itaconic acid and its ester as enumerated above and vinyl monomer, such as styrene, α-methylstyrene, vinyl acetate, acrylonitrile, methacrylonitrile, etc.

As examples of polyurethane polyol, mention may be made of reaction product of polyol and polyisocyanate which has terminal hydroxyl group. Examples of the polyol are polyol, such as ethylene glycol, propylene glycol, butylene glycol, hexylene glycol, neopentyl glycol, cyclohexanediamethanol, diethylene glycol, triethylene glycol, dipropylene glycol, glycerol, trimethylolpropane, pentaerythritol, sorbitol, etc. or polymer polyol, such as polyester polyol, polyether polyol, polyester ether polyol, polyester amide polyol, etc. As the polyisocyanate, mention may be made of tetramethylene diisocyanate, hexamethylene diisocyanate, 2,6- diisocyanatomethylcaproate, 3-isocyanatomethyl-3,5,5-trimethylcyclohexyl isocyanate, 4,4'-methylenebis(cyclohexyl isocyanate), 1,3- or 1,4-bis(isocyanatomethyl)cyclohexane, methylcyclohexane-2,4-diisocyanate, m- or p-phenylene diisocyanate, diphenylmethane-4,4'-diisocyanate, 2,4- or 2,6-tolylene diisocyanate, 1,3- or 1,4-xylylene diisocyanate or dimer, trimer, etc. of the polyisocyanate. Furthermore, reaction product of said polyisocyanate with said polyol a part of which is substituted with an amino compound such as ethylenediamine, propylenediamine, hexamethylenediamine, xylylenediamine, bisaminomethylcyclohexane, 3-aminomethyl-3,5,5-trimethylcyclohexylamine, ethanolamine, propanolamine, etc. may also be used as the polyurethane polyol.

As the epoxy polyol, there may be used condensation type epoxy resin obtained by reacting a polyphenol compound or its nuclear hydrogenated product with epichlorohydrin. Furthermore, epoxy ester resin obtained by reacting a fatty acid with an epoxy resin and modified epoxy resin obtained by reacting an alkanol amine with an epoxy resin may also be used.

Examples of the polyhydroxyalkane are hydrolyzed products of vinyl acetate homopolymer or copolymer of vinyl acetate with other ethylenic copolymerizable monomer and polybutadiene polyol.

Of these polyol components, compounds having 2 to 6, preferably 2 to 4 functional groups and having a mean molecular weight of at least 10,000, preferably 200 to 5,000 are the compounds having active hydrogen which may be suitably used in this invention, when the present method is applied to solventless system.

Not only the hydroxyl group-containing compounds of relatively high molecular weight mentioned above, but low-molecular weight polyol or polyamine having a molecular weight of about 60 to 200 may also be used alone or as mixtures. Examples of the low molecular weight polyol are ethylene glycol, propylene glycol, butylene glycol, hexylene glycol, neopentyl glycol, cyclohexanedimethanol, glycerol, trimethylol propane, pentaerythritol, diethylene glycol, triethylene glycol, dipropylene glycol, etc. Examples of the low molecular weight polyamine are aliphatic polyamine, such as ethylenediamine, propylenediamine, trimethylenediamine, diethylenetriamine, tetramethylenediamine, hexamethylenediamine, etc., aromatic polyamine, such as tolylenediamine, phenylenediamine, 4,4'-diaminodiphenylmethane, 4,4'-methylenebisorthochloroaniline, 1,2,4-triaminobenzene, etc., alicyclic polyamine, such as piperazine, cyclohexylenediamine, isophoronediamine, etc., aralkyl polyamine, such as xylylenediamine, etc., hydrazine, etc. Furthermore, water may also be used like said low molecular weight polyol and polyamine.

The proportion of the compound having trione ring and isocyanate group to the compound having active hydrogen is such that the ratio of the sum of the numbers of the trione ring and the isocyanate group to the number of the active hydrogen of the compound having active hydrogen is generally 0.1 to 10, preferably 0.5 to 3, more preferably 0.8 to 1.2.

As the tertiary amine used in this invention mention may be made of an aromatic or aliphatic tertiary amine. The amine includes a chain and cyclic amine and polyamine, such as diamine, triamine, etc. is used besides monoamine. As examples of aliphatic tertiary amine, mention may be made of a chain aliphatic monoamine such as trimethylamine, triethylamine, tripropylamine, dimethylethylamine, dimethylcyclohexylamine, diethylcyclohexylamine, dimethylethanolamine, triethanolamine, diethylethanolamine, ethyldiethanolamine, dimethylisopropanolamine, triisopropanolamine, etc., chain aliphatic di- or tri-amine, such as N-tetramethylethylenediamine, N-tetramethylhexane-1,6-diamine, N-pentamethyldiethylenetriamine, bis(2-dimethylaminoethoxy)methane, N,N,N'-trimethyl-N'-(2-hydroxyethyl)ethylenediamine, N,N-dimethyl-N',N'-(2-hydroxyethyl)ethylenediamine, tetramethylguanidine, etc., and a cycloaliphatic mono-, di- or tri-amine, such as N-methylpiperidine, N-ethylpiperidine, N-methylmorpholine, N-ethylmorpholine, 1,4-dimethylpiperazine, 1,2,4-trimethylpiperazine, N-(2-dimethylaminoethyl)morpholine, 1-methyl-4-(2-dimethylaminoethyl)piperazine, 1,4-di-azabicyclo[2,2,2]octane, 2-methyl-1,4-diazabicyclo[2,2,2]octane, quinuclidine, 1,5-diazabicyclo[5,4,0]-5-undecene, 1,5-diazabicyclo[4,3,0]-5-nonene, etc. As aromatic tertiary amine, mention may be made of dimethylaniline, diethylaniline, dimethylbenzylamine, pyridine, picoline, quinoline, etc. Aliphatic tert.-amine is preferred.

Concentration of the tertiary amine present in gaseous phase may be within the range of about 10 to about 100,000 ppm, more preferably about 100 to about 20,000 ppm. The contacting temperature with the tertiary amine may vary within the range of about 0° to about 100° C., preferably about 10° to about 50° C. and usually about room temperature suffices. The contacting time may vary depending on composition of resins, temperature, thickness of film, kind and concentration of the tertiary amine and is generally about 1 to about 10 minutes.

The tertiary amine present in gaseous phase includes not only one present as vapor phase, but one dispersed or floated as fine particles in other gaseous phases. For example, it may be present in the form of spray, aerosol, mist, etc. Moreover, the tertiary amine may be present as fine particles in the form of dissolved in or carried by other substances. That is, it may be used in the forms suitable for each purpose. As gaseous substances other than the tertiary amine, air is ordinarily used, but other gaseous substances such as nitrogen, steam, etc. which do not damage the activity of the tertiary amine may be used.

According to the method of this invention, firstly, a compound having trione ring and isocyanate group and a compound having active hydrogen are mixed and, secondary, the mixture is coated on a substrate and allowed to contact with a tertiary amine present in gaseous phase. The coating is usually about several to 500μ thick, although it varies depending on the object. In this case, both the compound having trione ring and isocyanate group and the compound having active hydrogen may be used without solvents, but they may be dissolved in or diluted with organic solvents and the like. These organic solvents include, for example, toluene, xylene, ethyl acetate, butyl acetate, cellosolve acetate, methyl ethyl ketone, methyl isobutyl ketone, cyclohexanone, etc. which are commonly used for urethane resins. Kinds and amounts of these organic solvents may be properly determined depending on the purpose. When solvents are used, it is preferred in many cases to select those which accelerate permeation speed of the tertiary amine, which are catalysts.

The tertiary amine present in gaseous phase as curing catalyst can afford sufficient curing and reaction rates. However, a catalyst capable of promoting the reaction between trione ring or isocyanate group and active hydrogen may be added to the compound having trione ring and isocyanate group or the compound having active hydrogen or a mixture of these compounds. Examples of these catalysts besides the tertiary amine or organic compounds, organic acid salts, inorganic salts, etc. of metals such as tin, lead, nickel, zinc, titanium, antimony, iron, cobalt, bismuth, uranium, cadmium, aluminum, vanadium, mercury, potassium, sodium, zirconium, calcium, etc. which adjust reaction rate of trione ring or NCO group with OH group. Addition of these catalysts is especially effective when catalytic action of the tertiary amine present in gaseous phase is liable to occur at the surface of coating and reaction rate inside the coating is not sufficient and since addition of the catalysts causes reduction of pot life of mixtures, the kind and amount of the catalysts should be adjusted depending on the purposes. Furthermore, if necessary, there may be properly used various additives such as pigments, dyes, leveling agents, antifoamers, anti-sag agents, fillers, plasticizers, antioxidants, ultraviolet absorbers, binders, etc.

The method of this invention is applicable to various fields such as coating materials, printing inks, adhesives, films, etc., where urethane resins are used. When the mixture is coated on a substrate and cured thereon, woods, metals such as iron and aluminum, plastics, rubbers, papers, tiles, concretes, slates, various boards, composite materials, etc. may be used as the substrates.

According to the method of this invention, curing and drying can be accomplished, to our surprise, in a short time even when compounds having aliphatic or alicyclic isocyanate group are used. Therefore, the method for producing polyurethane resins of this invention can be advantageously employed in the fields such as line coating, printing, bonding and film forming processes where coating is continuously carried out and curing and drying should be accomplished in a short time. Thus cured and dried film is of non-yellowing property and so can also be used for outer uses which require especially weather resistance.

The following examples will further illustrate this invention.

REFERENCE EXAMPLE 1

To 841 g of hexamethylene diisocyanate was added 1.8 g of tri-n-butylphosphine while introducing carbon dioxide thereinto at 40° C. and the reaction was carried out for 6 hours while stirring. Feeding of carbon dioxide was discontinued and 0.3 g of sulfur powder was added to the reaction product. The product was stirred for 30 minutes and then cooled. Starting materials were removed therefrom with a film evaporator to obtain 255 g of a somewhat viscous liquid of pale yellow. This product had an NCO content of 4.78 meq/g, oxadiazinetrione ring content of 2.77 meq/g, a residual monomer content of 0.4% and a viscosity (Gardner) of Y-Z (2,000 cps) at 25° C.

REFERENCE EXAMPLE 2

To 971 g of 1,3-bis(isocyanatomethyl)cyclohexane was added 2.1 g of tri-n-butylphosphine while introducing carbon dioxide at 0° C. and the reaction was carried out for 7 hours while stirring. Introduction of carbon dioxide was replaced by nitrogen and 2.7 g of benzoyl peroxide was added and stirring was carried out for 30 minutes. Starting materials were removed from the product with a film evaporator to obtain 165 g of viscous liquid of pale yellow. This product was dissolved in 55 g of butyl acetate to obtain a solution of 3.30 meq/g in NCO content and 1.64 meq/g in oxadiazine trione content.

EXAMPLE 1

10 g of the compound having trione ring and isocyanate group which was obtained in Reference Example 1 and 30.9 g of polyester polyol: Takelac ®U-25 (OH value: 137 and non-volatile matter: 75% and manufactured by Takeda Chemical Industries, Ltd.). This mixed liquid was diluted with 25 ml of a mixed solvent of toluene, butyl acetate and cellosolve acetate (1:1:1). Separately, the same mixed liquid was prepared and 0.1 g of N,N,N'-trimethyl-N'-(hydroxyethyl)ethylenediamine was added thereto as an internal catalyst and this was diluted in the same manner as above. Each diluted liquid was spray-coated on a cold rolled steel plate at a film thickness of about 30μ. These coated plates were allowed to contact with air containing 0.3% (volume) of tetramethylethylenediamine vapor at 25° C. for 5 minutes, then taken out from the amine-containing air and left to stand at 25° C. to examine the curing state of the film. The results are shown in Table 1. For comparison, two samples made in the same manner as above except that these were not treated in the air containing the amine were also examined in their curing state at 25° C. The results are also shown in Table 1.

As is clear from Table 1, when amine vapor treatment was made, cured films can be obtained in a markedly short time as compared with when no amine vapor treatment was made.

TABLE 1

| Addition of internal catalyst | No | | Yes | |
|---|---|---|---|---|
| Amine vapor treatment | Yes | No | Yes | No |
| Curing time | | | | |
| (1) Ethyl acetate spot test (Hr) | 2.5 | >24 | 1 | 10 |
| (2) Dry through (Hr) | 5 | >24 | 3 | >24 |

(1) Time required for the film no longer causing dissolution and shrink when 0.5 ml of ethyl acetate is dropped on the film and for the film no longer sticking to a finger.
(2) Dry through time according to JIS K-5400.

EXAMPLE 2

Diluted liquids were prepared in the same manner as in Example 1 except using 100 g of acryl polyol: Acrydic ®A-801 (OH value: 50 and nonvolatile matter: 50% and manufactured by Dainippon Ink & Chemicals Inc.) and the compounds having trione ring and isocyanate group as shown in Table 2 and internal catalyst in some cases. These liquids were spray coated on cold rolled steel plates at a thickness of 30μ. Each of these coated plates was allowed to contact with air containing vapor of amine compounds as shown in Table 2 at 30° C. for a period as shown in Table 2. The coated plates were taken out and allowed to stand at room temperature. Curing state of the film was examined. As comparative example, the same process was carried out using isocyanate component containing no trione ring. Results are shown in Table 2.

As is clear from Table 2, cured films were obtained in extremely short time from the compounds having trione ring and isocyanate group.

TABLE 2

| Compounds having isocyanate (g) | Compound obtained in Reference Example 1 11.8 | Compound obtained in Reference Example 1 11.8 | Compound obtained in Reference Example 1 11.8 | Compound obtained in Reference Example 1 11.8 | Compound obtained in Reference Example 1 11.8 | Compound obtained in Reference Example 1 11.8 | HDI biuret* |
|---|---|---|---|---|---|---|---|
| Internally added catalyst (g) | — | TMHDA 0.05 | TMHDA 0.05 | TMHDA 0.1 | — | THEDA 0.1 | — |
| Gaseous phase amines (mg/l) | DMCA 12 | DMCA 12 | DMCA 4 | DMCA 12 | TMHDA 8 | TMHDA 8 | Dimethylcyclohexylamine 12 |
| Contacting time (min) | 10 | 10 | 10 | 3 | 6 | 6 | 10 |
| Curing time | | | | | | | |
| (1) Spot test with ethyl acetate (min) | 20 | 10 | 15 | 20 | 20 | 12 | 80 |
| (2) Dry through (hr) | 1.0 | 0.6 | 1.0 | 0.8 | 1.2 | 0.5 | 2.5 |

TMHDA: N,N,N',N'—tetramethyl-1,6-diaminohexane
DMCA: Dimethylcyclohexylamine
THEDA: N,N,N',N'—trimethyl-N'—(hydroxyethyl)ethylenediamine
*Biuret of hexamethylene diisocyanate (NCO content 21.6% and nonvolatile matter 90%)
(1), (2): Same as in Example 1

EXAMPLE 3

To 30 g of polyoxypropylene polyol (OH value: 530 and non-volatile matter: 100%) obtained by adding propylene oxide to trimethylolpropane was added the compound having trione ring and isocyanate group as shown in Table 3 together with or without the catalyst as shown in Table 3, followed by well mixing them to obtain mixed liquids. Each of these mixed liquids was coated on a glass plate at a thickness of about 50μ by a film applicator and left to stand in a cell through which the amine as shown in Table 3 was sprayed and circulated for 15 minutes. This coated glass plate was taken out into air of room temperature and left to stand to examine the curing state of the film. Results are shown in Table 3.

As is clear from Table 3, when amine vapor treatment was carried out, polyurethane cured product was obtained in a short time.

aliphatic or alicyclic polyisocyanate with carbon dioxide and the compound having active hydrogen being a polyol having at least two active hydrogens and a molecular weight of 62 to 100,000.

2. A method according to claim 1 wherein the aliphatic polyisocyanate is hexamethylene diisocyanate.

3. A method according to claim 1, wherein the alicyclic polyisocyanate is bis(isocyanatomethyl)cyclohexane.

4. A method according to claim 1 wherein the compound having 1-oxa-3,5-diazine-2,4,6-trione ring and isocyanate group has an average functionality of 2 to 10.

5. A method according to claim 4 wherein the average functionality is 2 to 5.

6. A method according to claim 1 wherein the polyol has a molecular weight of 200 to 50,000.

7. A method according to claim 6 wherein the polyol has 2 to 50 hydroxyl groups in one molecule and a molecular weight of 200 to 50,000.

TABLE 3

| Compound having trione ring and isocyanate group (g) | Compound obtained in Ref. Example 1 37.5 | Compound obtained in Ref. Example 2 57.3 | Compound obtained in Ref. Example 2 57.3 | Compound obtained in Ref. Example 2 57.3 | Compound obtained in Ref. Example 1 59 | Compound obtained in Ref. Example 2 86 |
|---|---|---|---|---|---|---|
| Internally added catalyst (g) | — | — | DBTL* 0.004 | DBu** 0.02 | — | DBTL 0.004 |
| Amine (mg/l air) | Bis(2-dimethylaminoethyl)methylamine 6 | N,N—diethylethanolamine 50 | N,N—diethylethanolamine 50 | N,N—diethylethanolamine 50 | — | — |
| (1) Tack free | 6 Hr | 4 Hr | 3 Hr | 2 Hr | 2 days | 3 days |

*DBTL: Dibutyltin dilaurate
**DBu: 1,5-diazabicyclo [5,4,0]-5-undecene
(1): According to JIS K-5400

We claim:

1. A method for producing a polyurethane resin which comprises contacting a compound having a 1-oxa-3,5-diazine-2,4,6-trione ring and an isocyanate group and a compound having active hydrogen with a tertiary amine present in the gaseous phase; the compound having a 1-oxa-3,5-diazine-2,4,6trione ring and an isocyanate group being a reaction product of an 8. A method according to claim 1 wherein the polyol is polyester polyol, polyether polyol, polyether-ester polyol, polyester-amide polyol, acrylic polyol, polyurethane polyol, epoxy polyol, epoxy modified polyol, polyhydroxyalkane, oil-modified polyol, castor oil or mixtures thereof.

9. A method according to claim 8 wherein the polyol is polyesters polyol.

10. A method according to claim 8 wherein the polyol is polyether polyol.

11. A method according to claim 8 wherein the polyol is acrylic polyol.

12. A method according to claim 1 wherein the polyol is that having 2 to 6 functional groups and a mean molecular weight of at least 10,000, when the said method is applied to solvent system.

13. A method according to claim 12 wherein the polyol is that having 2 to 4 functional groups and a mean molecular weight of 200 to 5,000.

14. A method according to claim 1 wherein proportion of the compound having trione ring and isocyanate group to the compound having active hydrogen is such that the ratio of the sum of the number of the trione ring and the isocyanate group to the number of the active hydrogen of the compound having active hydrogen is 0.1 to 10.

15. A method according to claim 11 wherein the proportion is 0.5 to 3.

16. A method according to claim 1 wherein the tertiary amine is an aliphatic or aromatic tertiary amine.

17. A method according to claim 16 wherein the tertiary amine is an aliphatic tertiary amine.

18. A method according to claim 17 wherein the aliphatic tertiary amine is a chain aliphatic mono-, di- or tri-amine, or a cycloaliphatic mono-, di- or tri-amine.

19. A method according to claim 18 wherein the chain aliphatic mono-amine is diethylethanolamine.

20. A method according to claim 18 wherein the chain aliphatic di-amine is tetramethylethylenediamine.

21. A method according to claim 18 wherein the chain aliphatic tri-amine is bis(2-dimethylaminoethyl)-methylamine.

22. A method according to claim 18 wherein the cycloaliphatic mono-amine is dimethylcyclohexylamine.

23. A method according to claim 1 wherein concentration of the tertiary amine present in gaseous phase is within the range of 10 to 100,000 ppm.

24. A method according to claim 23 wherein the concentration is 100 to 20,000 ppm.

25. A method according to claim 1 wherein the contacting temperature with the tertiary amine is within 0° to 100° C.

26. A method according to claim 25 wherein the contacting temperature with the tertiary amine is 20°–50° C.

27. A method according to claim 25 wherein the temperature is room temperature.

* * * * *